(12) United States Patent
Sun

(10) Patent No.: US 11,567,507 B2
(45) Date of Patent: Jan. 31, 2023

(54) TRAVELLING SUPPORT SYSTEM, TRAVELLING SUPPORT METHOD AND PROGRAM THEREFOR

(71) Applicant: DENSO CORPORATION, Kariya (JP)

(72) Inventor: Litian Sun, Kariya (JP)

(73) Assignee: DENSO CORPORATION, Kariya (JP)

( * ) Notice: Subject to any disclaimer, the term of this patent is extended or adjusted under 35 U.S.C. 154(b) by 195 days.

(21) Appl. No.: 17/071,885

(22) Filed: Oct. 15, 2020

(65) Prior Publication Data

US 2021/0116931 A1  Apr. 22, 2021

(30) Foreign Application Priority Data

Oct. 16, 2019  (JP) .............................. JP2019-189383

(51) Int. Cl.
| | | |
|---|---|---|
| *G05D 1/02* | (2020.01) | |
| *B60W 30/18* | (2012.01) | |
| *G06K 9/00* | (2022.01) | |
| *G06V 20/58* | (2022.01) | |

(52) U.S. Cl.
CPC ..... *G05D 1/0223* (2013.01); *B60W 30/18163* (2013.01); *G06V 20/58* (2022.01); *B60W 2554/20* (2020.02); *B60W 2554/4041* (2020.02); *B60W 2554/4045* (2020.02); *G05D 2201/0213* (2013.01)

(58) Field of Classification Search
CPC ......... B60W 30/18163; B60W 60/001; B60W 2554/20; B60W 2554/402; B60W 2554/4041; B60W 2554/4045; B60W 2756/10; G05D 1/0223; G05D 2201/0213; G06V 20/58; G08G 1/0112; G08G 1/0133; G08G 1/096725; G08G 1/096741; G08G 1/096775; G08G 1/096838
See application file for complete search history.

(56) References Cited

U.S. PATENT DOCUMENTS

| | | | | |
|---|---|---|---|---|
| 2013/0305080 A1* | 11/2013 | Behrendt | ............ | G06F 11/3006 709/224 |
| 2015/0175149 A1* | 6/2015 | Zhao | ...................... | F02D 28/00 903/903 |
| 2016/0061610 A1* | 3/2016 | Meyer | ..................... | B60L 58/12 701/22 |
| 2016/0202074 A1* | 7/2016 | Woodard | ............ | G06Q 10/047 701/465 |
| 2018/0345963 A1 | 12/2018 | Maura | | |

FOREIGN PATENT DOCUMENTS

| | | |
|---|---|---|
| JP | 2019028526 A | 2/2019 |
| WO | WO-2017136283 A1 * | 8/2017 |

* cited by examiner

*Primary Examiner* — Peter D Nolan
*Assistant Examiner* — Ce Li Li
(74) *Attorney, Agent, or Firm* — Maschoff Brennan

(57) ABSTRACT

A travelling support system includes a receiving unit configured to receive parked/stopped vehicle information indicating a detection of a parked/stopped vehicle on a travelling road from a preceding vehicle which is travelling or a sensor on the travelling road; and a predicting unit that predicts, based on the parked/stopped vehicle information and a duration predicting model that predicts a parked/stopped duration as a duration in which the parked/stopped vehicle continues to park or stop, the parked/stopped duration.

9 Claims, 9 Drawing Sheets

FIG.6
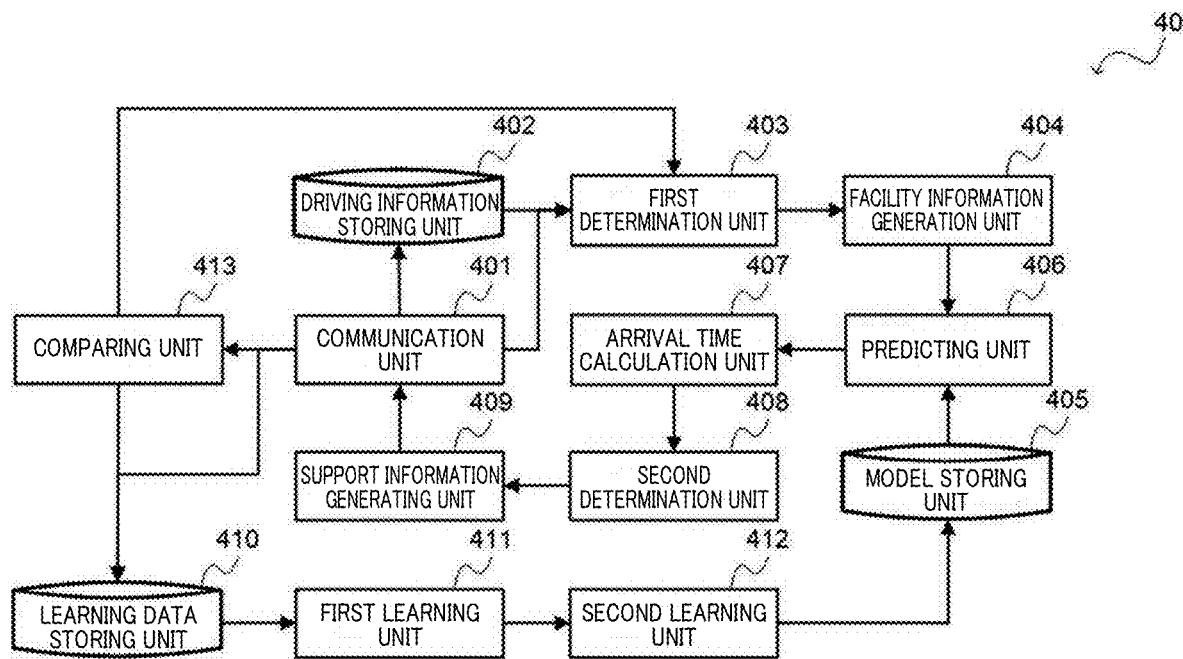
FIG.7
S1 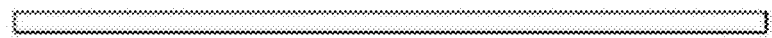
S2 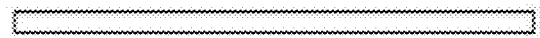

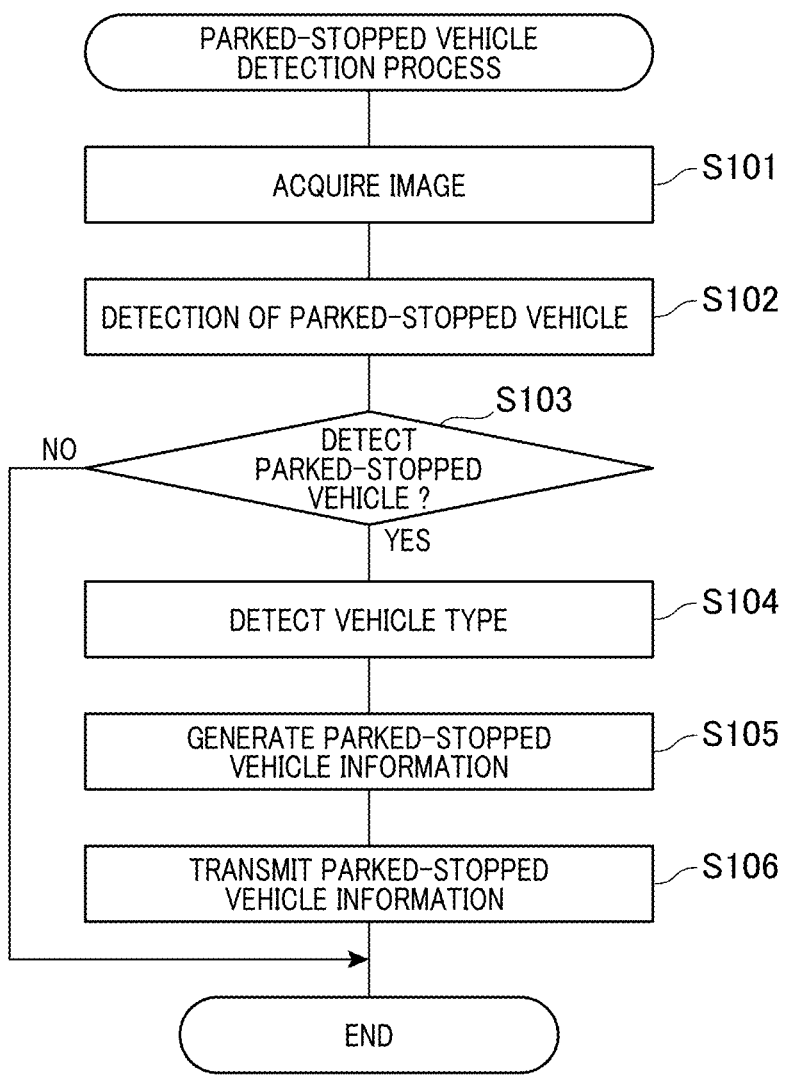

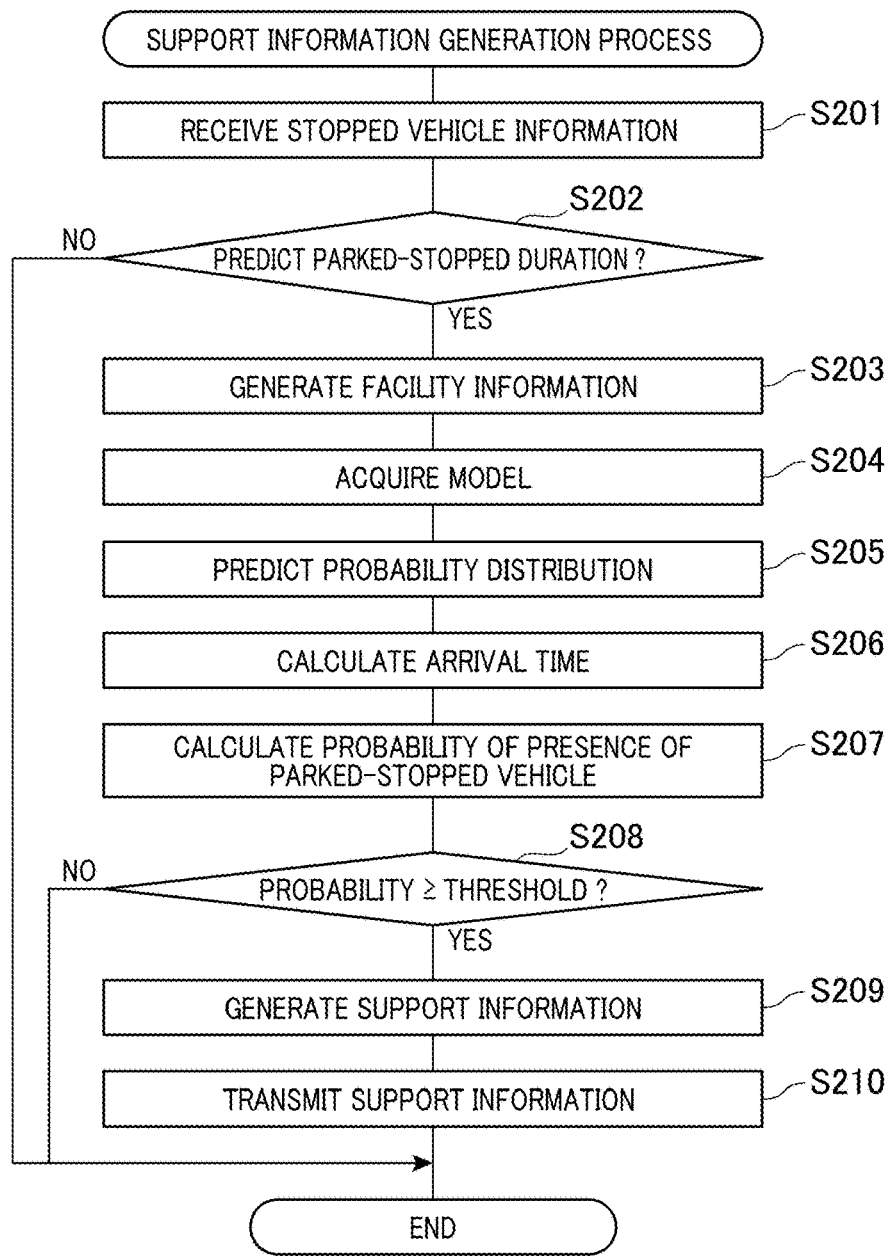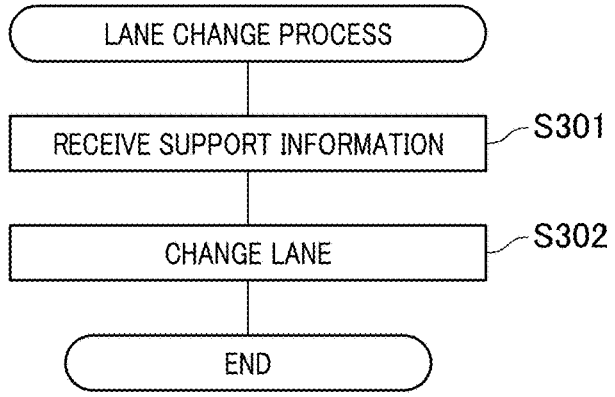

TRAVELLING SUPPORT SYSTEM, TRAVELLING SUPPORT METHOD AND PROGRAM THEREFOR

CROSS-REFERENCE TO RELATED APPLICATION

This application is based on and claims the benefit of priority from earlier Japanese Patent Application No. 2019-189383 filed Oct. 16, 2019, the description of which is incorporated herein by reference.

BACKGROUND

Technical Field

The present disclosure relates to a travelling support system, a travelling support method and a program for a travelling support.

Description of the Related Art

As travelling support techniques, various methods are disclosed. For example, a method for travelling support is disclosed, which utilizes obstacle information acquired by a preceding vehicle as a driving support information. Moreover, a method for a travelling support is disclosed in which a plurality of available traveling routes are acquired and a congested route is predicted.

SUMMARY

The present disclosure provides a travelling support system capable of predicting a duration for which a vehicle will be parked/stopped on a road being travelled, a travelling support method and a program for a travelling support.

The travelling support system according to the present disclosure includes a receiving unit and a predicting unit. The receiving unit is configured to receive parked/stopped vehicle information indicating a detection of a parked/stopped vehicle on a travelling road from a preceding vehicle which is travelling or a sensor on the travelling road. The predicting unit is configured to predict, based on the parked/stopped vehicle information and a duration predicting model that predicts a parked/stopped duration as a duration in which the parked/stopped vehicle continues to park or stop, the parked/stopped duration.

BRIEF DESCRIPTION OF THE DRAWINGS

In the accompanying drawings:

FIG. 6 is a block diagram showing a functional configuration of the automatic driving center;

FIG. 7 is a conceptual diagram showing an example of samples of learning data;

FIG. 11 is a flowchart showing a parked/stopped vehicle detecting process of the on-vehicle equipment;

FIG. 12 is a flowchart showing a support information generation process of the automatic driving center;

FIG. 13 is a flowchart showing a lane change process of the on-vehicle equipment;

DETAILED DESCRIPTION OF THE PREFERRED EMBODIMENTS

As an example of a travelling support technique, Japanese Patent Application Laid-Open Publication No. 2017-117080 discloses a method of travelling support. In the method, the own vehicle externally acquires obstacle information including positional information of the object on the map which has been acquired by preceding vehicles travelling on a planned traveling route where the own vehicle is running and generates, based on lane information and obstacle information of the planed travelling route, a target speed and a travelling trajectory candidate of the own vehicle as support information used for an automatic driving support executed in the own vehicle traveling on the planned traveling route.

Moreover, as another example of the travelling support technique, Japanese Patent Application Laid-Open Publication No. 2019-028526 discloses a method of travelling support.

In the method, a plurality of routes available for a traveling from the departure place to the destination are acquired, a traffic volume of moving bodies moving from the departure place to the destination is distributed into the plurality of routes with a predetermined distribution ratio, a route traffic volume indicating each traffic volume of the plurality of routes is calculated, a time-route section traffic volume indicating a traffic volume of moving bodies passing through each section in the route at each time section is calculated based on the route traffic volume, a distance section which is a distance of each section included in the route or a required time section which is a required time for passing each section, and a congestion level of each section is calculated based on the time-route section traffic volume, thereby estimating a section in which congestion is predicted to occur in the travelling route on which the moving bodies travel to the destination from the departure place.

However, according to existing methods, duration of parked/stopped vehicles on a traveling road cannot be predicted. Hence, a problem arises that appropriate travelling support taking parked/stopped vehicles into consideration cannot be achieved.

Hereinafter, with reference to the drawings, embodiments of the present disclosure will be described.

Firstly, a configuration of a travelling support system according to an embodiment of the present disclosure will be described. A travelling support system 1 according to the present disclosure will be described with reference to FIGS. 1 and 2.

Figure 1:
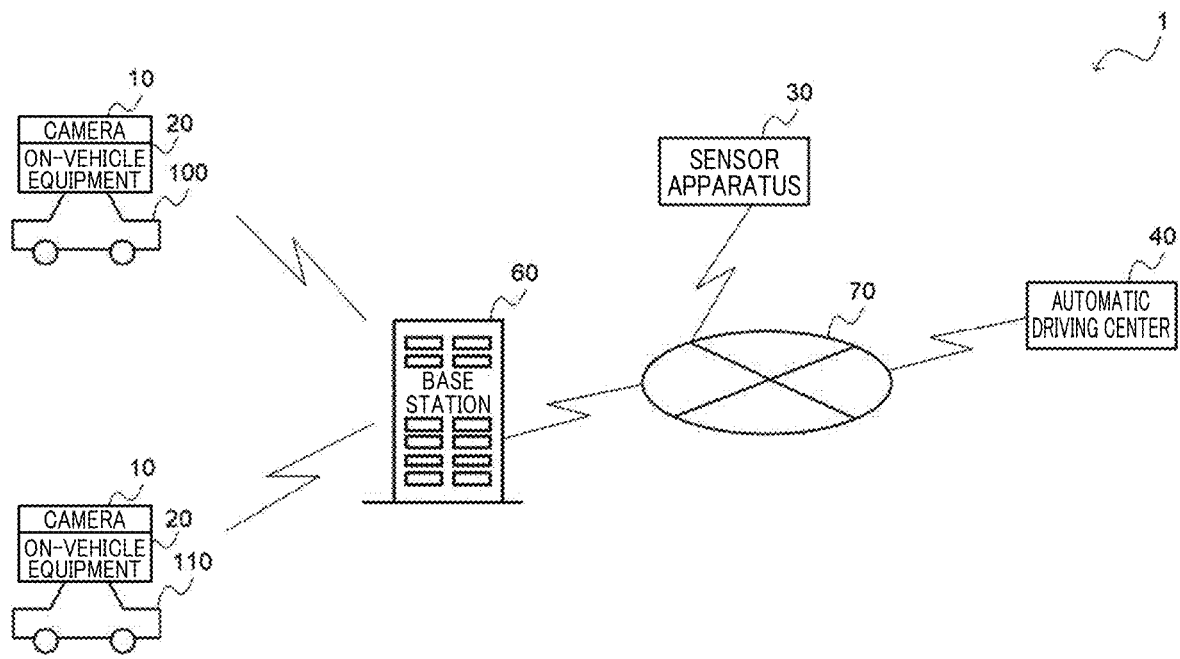
FIG. 1 is a block diagram showing a configuration of the travelling support system.

FIG. 1 is a block diagram showing a configuration of the travelling support system 1 according to the embodiment of the present disclosure. As shown in FIG. 1, the travelling support system 1 according to the embodiment of the present disclosure is configured of a camera 10, an on-vehicle equipment 20, an automatic driving center 40, a base station 60 and a network 70. The travelling support system 1 will be described for a case where a vehicle equipped with the on-vehicle equipment 20 is performing an automatic driving based on the travelling support information generated by the automatic driving center 40.

Figure 2:
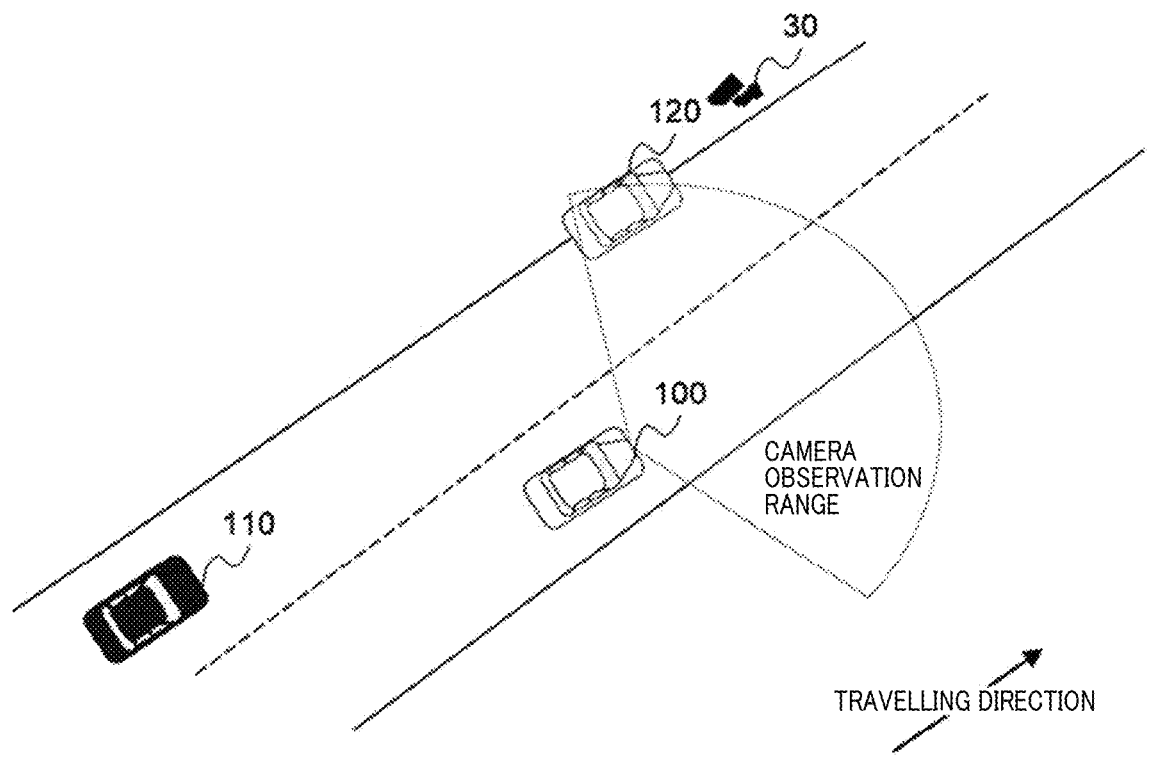
FIG. 2 is a conceptual diagram showing an example of assumed scene in the travelling support system.

For example, the travelling support system 1 is utilized in a case where a parked/stopped vehicle 120 is parked or stopped on a lane of a travelling road having a plurality of lanes, a preceding vehicle 100 is configured to detect the parked/stopped vehicle 120, and a travelling vehicle 110 plans to travel on the lane. In FIG. 2, the preceding vehicle 100 and the traveling vehicle 110 are travelling in a travelling direction.

Note that the parked-stopped vehicle 120 is a stationary vehicle which is temporally stopped or parked for a longer time on the travelling road.

The base station 60 serves as a wireless-communication base station connected to the network 70 and performs a wireless communication with the on-vehicle equipment 20. The network 70 is a public network such as internet or wide-area Ethernet.

A camera 10 is mounted on the preceding vehicle 100 and the travelling vehicle 110. The camera 10 captures an image in the vicinity of the vehicle. For example, the camera 10 captures an image ahead of the vehicle with a wide angular range. The camera 10 transmits the captured image to the on-vehicle equipment 20.

Figure 3:
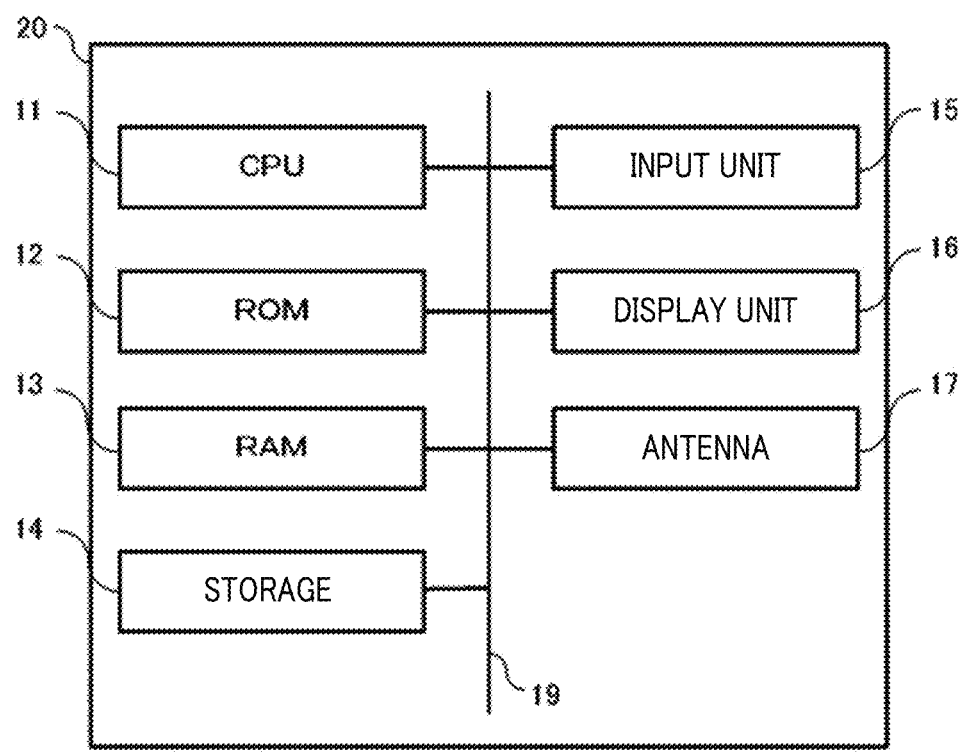
FIG. 3 is a block diagram showing a hardware configuration of an on-vehicle equipment.
Figure 4:
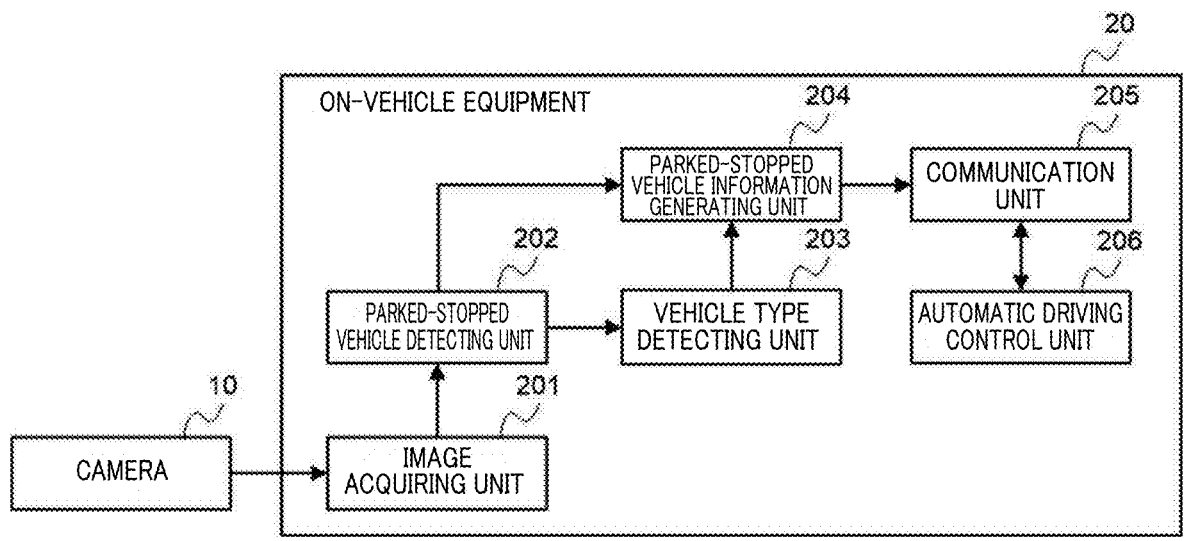
FIG. 4 is a block diagram showing a functional configuration of the on-vehicle equipment.

The on-vehicle 20 executes an automatic driving control process. With reference to FIGS. 3 and 4, a configuration of the on-vehicle equipment 20 will be described.

FIG. 3 is a block diagram showing a hardware configuration of the on-vehicle equipment 20. As shown in FIG. 3, the on-vehicle equipment 20 includes a CPU (central processing unit) 11, a ROM (read only memory) 12, a RAM (random access memory) 13, a storage 14, an input unit 15, a display unit 16 and an antenna 17. The respective configurations are mutually and communicably connected via a bus 19.

The CPU 11 serves as a central processing unit so as to execute various programs or control various units. In other words, the CPU 11 reads the programs from the ROM 12 or the storage 14 and executes the programs with the RAM 13 as a working area. The CPU 11 controls the above-described respective configurations and performs various processing in accordance with the programs stored in the ROM 12 or the storage 14. According to the present embodiment, the ROM 12 or the storage 14 stores a parked/stopped vehicle detecting program for executing a parked/stopped vehicle detecting process and a lane change program for executing a lane change process.

The ROM 12 stores various programs and various data. The RAM 13 temporarily stores programs or data as a working area. The storage 14 is configured of a HDD (hard disk drive) or a SSD (solid state drive) storing various programs including an operating system and various data.

The input unit 15 includes a pointing device such as mouse, a keyboard and a voice input device which are used for various input operations.

The display unit 16 is, for example, a liquid crystal display or a speaker, which display or reproduce various information. The display unit 16 may serve as the input units using a touch panel.

The antenna 17 is a wireless communication antenna used for a wireless communication with other equipment. For the wireless communication, specification such as LTE, 5G, Wi-Fi (registered trademark) are used.

FIG. 4 is a block diagram showing a functional configuration of the on-vehicle equipment 20 according to the present embodiment. As shown in FIG. 4, the on-vehicle equipment 20 of the present disclosure is provided with an image acquiring unit 201, a parked/stopped vehicle detecting unit 202, a vehicle type detecting unit 203, a parked/stopped vehicle information generating unit 204, a communication unit 205 and an automatic driving control unit 206.

The image acquiring unit 201 acquires an image captured by the camera 10. Then, the image acquiring unit 201 transmits the acquired image to the parked/stopped vehicle detecting unit 202.

The parked/stopped vehicle detecting unit 202 detects the parked/stopped vehicle 120 from the image acquired by the image acquiring unit 201. Specifically, the parked/stopped vehicle detecting unit 202 analyzes the image to extract the parked/stopped vehicle 120. For example, the parked/stopped vehicle detecting unit 202 extracts a roadside strip of the travelling road and the vehicle in accordance with an image analysis. Then, as a detection result, the parked/stopped vehicle detecting unit 202 determines the vehicle to be the parked/stopped vehicle 120 when the vehicle is in the roadside strip. In the case where the parked/stopped vehicle 120 is detected, the parked/stopped vehicle detecting unit 202 transmits the detection result of the parked/stopped vehicle 10 to the vehicle type detecting unit 203.

Further, in the case where the parked/stopped vehicle 120 is detected, the parked/stopped vehicle detection unit 202 calculates the location of the parked/stopped vehicle 120 on the traveling road based on the position at which the camera 10 captured the image and the position on the captured image of the parked/stopped vehicle 120. Note that the position at which the camera 10 captured the image may be acquired using, for example, a GPS device (not shown). The parked/stopped vehicle detecting unit 202 calculates, when the parked/stopped vehicle 120 is detected, an occupancy ratio of the parked/stopped vehicle 120 on the traveling road. The parked/stopped vehicle detecting unit 202 calculates, when the traveling road has a plurality of lanes, an occupancy ratio of a lane on which the parked/stopped vehicle 120 is parked or stopped. Then, the parked/stopped vehicle detecting unit 202 transmits the detection result of the parked/stopped vehicle 120, the location of the parked/stopped vehicle 120 on the traveling road and the calculated occupancy to the parked/stopped vehicle information generation unit 204.

The vehicle type detecting unit 203 detects the type of the parked/stopped vehicle 120 detected by the parked/stopped vehicle detecting unit 202. According to the present embodiment, the type of vehicle refers to usage of the vehicle and does not refer to a type of vehicle of OEM (original equipment manufacturing). The type of vehicle refers to, for example, a truck as a type of vehicle used for carrying a cargo, a bus as a type of vehicle carrying passengers, a construction vehicle used for construction, and a private vehicle as a private use. According to the present embodiment, the above-mentioned four types of vehicles will be described. Note that a taxi can be categorized to a private vehicle, but may be defined as another type of vehicle.

Specifically, the vehicle type detecting unit 203 performs image analysis for the parked/stopped vehicle 120 to extract the type of vehicle. For example, the vehicle type detecting unit 203 analyzes the shape features of the parked/stopped vehicle 120 to determine the type of vehicle. Then, the vehicle type detecting unit 203 transmits the extracted type of vehicle to the parked/stopped vehicle information generating unit 204.

The parked/stopped vehicle information generating unit 204 generates the location of the parked/stopped vehicle 120 detected on the travelling road, the time at which the parked/stopped vehicle is detected, type of vehicle representing usage of the vehicle, and parked/stopped vehicle information including the occupancy ratio of the travelling road of the parked/stopped vehicle 120. Specifically, the parked/stopped vehicle information generating unit 204 generates the parked/stopped vehicle information with a timestamp at which the parked/stopped vehicle 120 is detected in the image captured by the camera 10.

The parked/stopped vehicle information generating unit 204 transmits the generated parked/stopped vehicle information to the communication unit 205.

The communication unit 205 transmits the parked/stopped vehicle information to the automatic driving center 40. Further the communication unit 205 receives the travelling support information from the automatic driving center 40. Then, the communication unit 205 transmits the travelling support information to the automatic driving control unit 206.

The automatic driving control unit 206 performs an automatic driving control for a vehicle in which the on-vehicle equipment 20 is mounted. Note that explanation of the automatic driving control is omitted. However, a publicly known automatic driving control technique or a future automatic driving technique can be applied to the automatic control itself. Also, the automatic driving control unit 206 periodically transmits automatic driving information of the vehicle in which the on-vehicle equipment 20 is mounted to the automatic driving center 40 via the communication unit 205. The driving information includes, for example, location of the vehicle, the travelling route and the travelling speed.

Further, the automatic driving control unit 206 performs a lane change operation when the travelling support information received by the communication unit 205 includes a command indicating a lane change.

Figure 5:
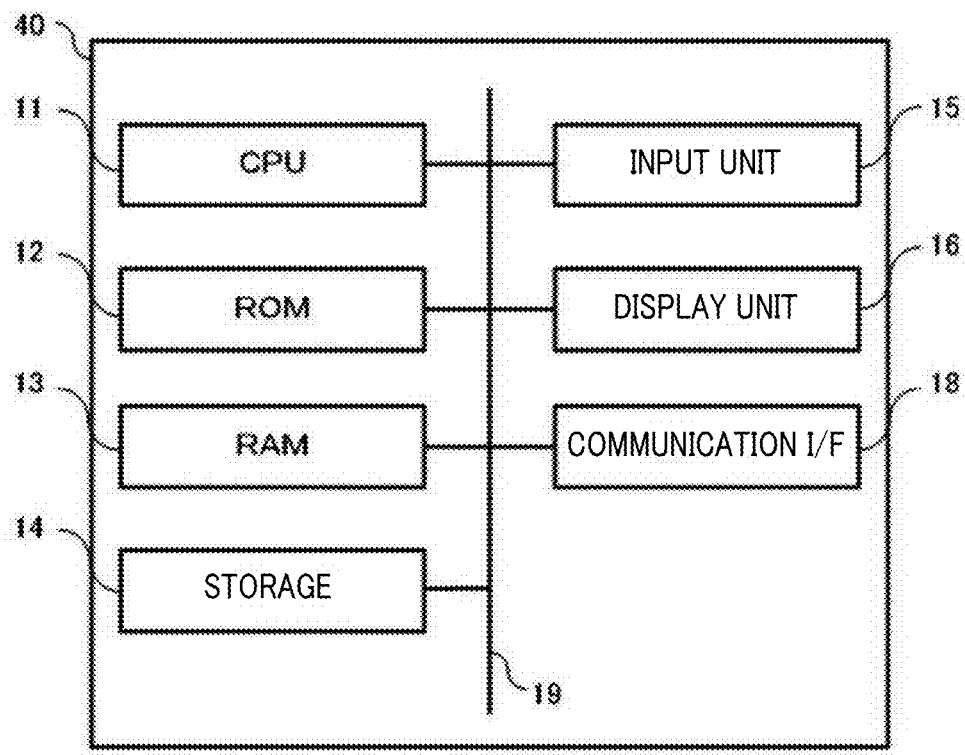
FIG. 5 is a block diagram showing a hardware configuration of an automatic driving center.

The automatic driving center 40 performs a travelling support executing the automatic driving of the vehicle in the travelling support system according to the embodiment of the present disclosure. With reference to FIGS. 5 and 6, a configuration of the automatic driving center 40 according to the present embodiment of the present disclosure will be described. FIG. 5 is a block diagram showing a hardware configuration of the automatic driving center according to the embodiment of the present disclosure. As shown in FIG. 5, the automatic driving center 40 includes a CPU 11, a ROM 12, a RAM 13, a storage 14, an input unit 15, a display unit 16 and a communication interface (I/F) 18. The respective configurations are mutually connected via the bus 19. Note that explanation for hardware configurations similar to the on-vehicle equipment 20 will be omitted. In the automatic driving center 40, a support information generation program for executing a support information generation process and a learning program for executing a learning process are stored thereto.

The communication interface 18 serves as an interface for communicating with other equipment. For example, specifications such as Ethernet (registered trademark), FDDI (fiber distribution data interface) and Wi-Fi (registered trademark) are used.

Next, the functional configuration of the automatic driving center 40 will be described. FIG. 6 is a block diagram showing an example of the functional configuration of the automatic driving center 40. As shown in FIG. 6, the automatic driving center 40 according to the present embodiment is configured to include a communication unit 401, a driving information storing unit 402, a first determination unit 403, a facility information generation unit 404, a model storing unit 405, a predicting unit 406, an arrival time calculation unit 407, a second determination unit 408, a support information generation unit 409, a learning data storing unit 410, a first learning unit 411, a second learning unit 412 and a comparing unit 413.

The communication unit 401 performs a communication with the on-vehicle equipment 20 via the network 70. Specifically, the communication unit 401 receives parked/stopped vehicle information from the on-vehicle equipment 20. Then, the communication unit 401 transmits the received parked/stopped vehicle information to the first determination unit 403 and the comparing unit 413. The communication unit 401 receives driving information from the on-vehicle equipment 20. The communication unit 401 stores the received driving information into the driving information storing unit 402. The communication unit 401 transmits the travelling support information generated by the support information generation unit 409 to the on-vehicle equipment 20 via the network 70.

The driving information storing 402 stores driving information for respective plurality of vehicles managed by the automatic driving center 40.

The first determination unit 403 determines whether the parked/stopped duration which is a duration of parking or stopping of the parked/stopped vehicle 120 on the travelling road should be predicted. Specifically, the first determination unit 403 determines whether a lane change is required based on the occupancy ratio of the travelling road of the parked/stopped vehicle 120 included in the parked/stopped vehicle information received by the communication unit 401. For example, the first determination unit 403 determines that a lane change is required in the case where the occupancy ratio of the travelling road is larger than or equal to a first threshold. The first threshold may be determined as a ratio which requires the lane change.

Next, the first determination unit 403 detects whether there is a travelling vehicle 110 among a plurality of vehicles managed by the automatic driving center 40, which reaches a lane on which the parked/stopped vehicle 120 are parked/stopped on the travelling road included in the parked/stopped vehicle information. More specifically, the first determination unit 403 acquires driving information for respective plurality of vehicles stored in the driving information storing unit 402, and acquires the travelling vehicle 110 which reaches the lane on which the parked/stopped vehicle 120 are parked/stopped.

In the case where the travelling vehicle 110 reaching the lane on which the parked/stopped vehicle 120 is parked/stopped, the first determination unit 403 determines that the parked/stopped duration need to be predicted, and transmits the parked/stopped vehicle information and the driving information of the detected travelling vehicle 110 to the facility information generation unit 404.

The facility information generation unit 404 generates facility information concerning a facility around the parked/stopped vehicle 120. Specifically, the facility information generation unit 404 extracts a facility located close to the parked/stopped vehicle 120 based on the location of the parked/stopped vehicle on the travelling road included in the parked/stopped vehicle information. Next, the facility information generation unit 404 generates the facility information of the extracted facility. The facility information to be extracted influences a parking/stopping operation of the vehicle, and includes a commercial building, a bus stop and a building site, for example. The facility information includes, for example, an entrance of the facility, a distance between the entrance of the facility and the parked/stopped vehicle, and commercial type of the commercial building. Then, the facility information generation unit 404 transmits the generated facility information to the predicting unit 406.

The model storing unit 405 stores a duration predicting model that predicts a parked/stopped duration as a duration in which the parked/stopped vehicle 120 continues to park or stop. The parked/stopped duration is learned in advance by the first learning unit 411. And the parked/stopped duration for different vehicle type is learned by the second learning unit 412. The model storing unit 405 stores a separate parameter model for each vehicle type, which is used in 411 for predicting model corresponding to the vehicle type.

A learning process of respective models to be stored into the model storing unit 405 will be described.

The learning data storing unit 410 stores plural sets of learning data. The learning data includes the vehicle type of the parked/stopped vehicle 120, the influential factors about the duration of the parked/stopped vehicle corresponding to the vehicle type, and a parked/stopped duration of the parked/stopped vehicle 120.

As the influential factors, at least either the facility information or time information at which the parked/stopped vehicle 120 is parked or stopped can be employed. For the time information, time of the day, day of week, season or the like can be used. This is because it is considered that the time of the day, the day of week may change the duration of parking or stopping. For example, in the vicinity of commercial facility such as large department store, duration of the parked/stopped vehicles tends to increase on Sunday in the daytime for shopping or the like, and vehicles such as trucks for carrying cargos are more likely to be parked or stopped on weekdays in the night time. According to the present embodiment, an example in which the facility information and the time information are used as influential factors is described. However, other influential factors or a combination of other influential factors can be used when the vehicle type duration predicting model is learned.

Figure 8:
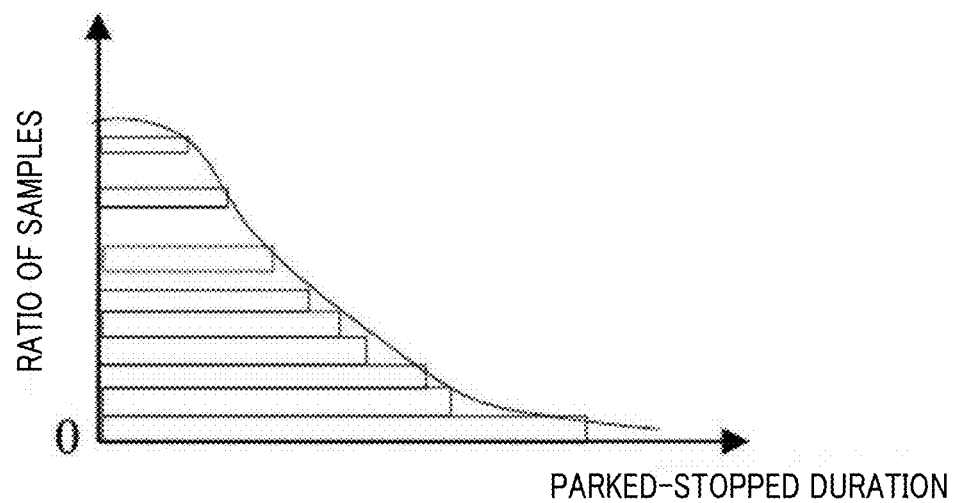
FIG. 8 is a graph showing a ratio of samples for each parked/stopped duration.

The parked/stopped duration can be expressed by a pair of a starting time and an end time of parking/stopping of the vehicle 120. As shown in FIG. 7, the lengths of sample S1 and S2 of the parked/stopped duration show the starting time and the end time. The learning data is collected, for example, using data detected by an on-road sensor or log data of the parked/stopped vehicles. As shown in FIG. 8, the collected learning data can be expressed as a graph showing a ratio of samples for each parked/stopped duration.

The first learning unit 411 learns the parameters of the duration predicting model based on a plurality of parked/stopped duration collected in advance such that the duration predicting model is a probability distribution model of the presence probability of the parked/stopped vehicle 120 for each parked/stopped duration.

Figure 9:
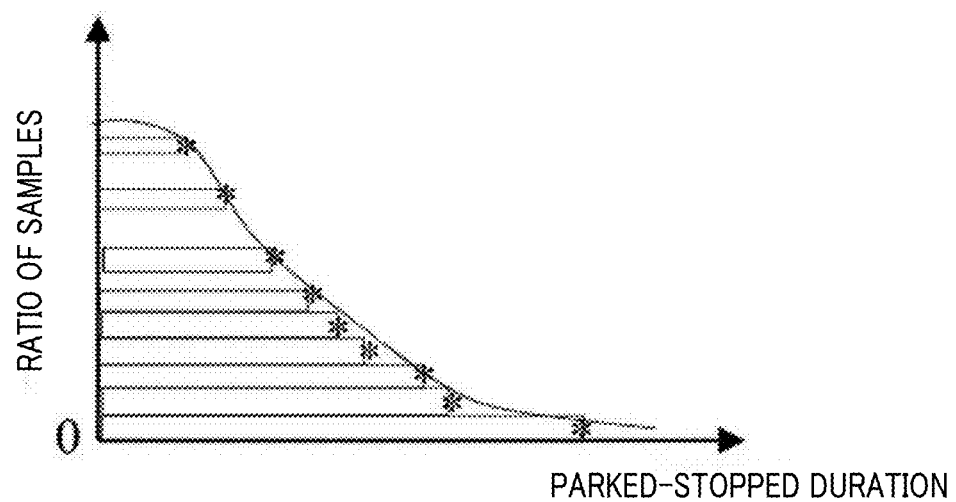
FIG. 9 is a graph showing an example of a probability distribution expressed by a duration predicting model.

Specifically, the first learning unit 411 acquires the learning data from the learning data storing unit 410. The first learning unit 411 learns the parameters of the duration predicting model such that the duration predicting model is approximated to a graph shown in FIG. 8 with a curve shown in FIG. 9 as a probability distribution representing a presence probability of the parked/stopped vehicle 120 for every parked/stopped duration. For example, the duration predicting model may use a probability distribution shown in the following equation (1).

$$f(t) = 1 - \frac{1}{1 + e^{-k(t-a)}} \qquad (1)$$

Here, in the above-described equation (1), k and a are parameters, and t is parked/stopped duration. For the duration predicting model, other probability distribution such as Gaussian distribution may be utilized, or a neural network may be utilized.

The first learning unit 411 is configured to learn the parameters of the duration predicting model using a regression approximation and a machine learning method such as an error back propagation method. The first learning unit 411 stores the learned duration prediction model into the model storing unit 405. The first learning unit 411 is configured to learn, for each pair of vehicle type and the corresponding influential factors of the learning data, the parameters of the duration predicting model of the pair and store them. In other words, in accordance with a plurality of learning data having the same vehicle type and the same influential factors, a set of parameters for the duration predicting model is learned. Also, the first learning unit 411 transmits the learning data and the learned duration predicting model to the second learning unit 412.

The second learning unit 412 learns a parameter model for each vehicle type, based on the duration predicting model learned by the first learning unit 411, a plurality of parked/stopped vehicle durations, the vehicle type of the parked/stopped vehicle 120 of the parked/stopped duration and the influential factors which are collected in advance. The parameter model outputs, in response to an input of the influential factors, the parameters of the duration prediction model corresponding to the vehicle type.

The parameter model is determined such that a relationship between the influential factors and the parameters of the probability distribution expressed by the parked/stopped duration predicting model is modelled for corresponding vehicle types. Specifically, the parameter model outputs, in response to an input of the influential factors, a set of parameters for the duration predicting model corresponding to the vehicle type of the parameter model. That is, the duration predicting model for the vehicle type v1 shows a probability distribution with parameters a1 and k1 which are outputted by the parameter model when the facility information and the time information are inputted as the influential factors.

The second learning unit 412 learns the parameters of the parameter model for each vehicle type, with a regression approximation and a machine learning method such as an error back propagation method, using the duration predicting model learned by the first learning unit 411 and the learning data. The second learning unit 412 stores the parameter model learned by each vehicle type into the model storing unit 405. The learning processes for each model has been described in the above.

The predicting unit 406 is configured to predict the probability distribution corresponding to the vehicle type, based on the parked/stopped vehicle information and the parameter model learned by the second learning unit 412.

Specifically, the predicting unit 406 acquires, from the model storing unit 405, a parameter model corresponding to the vehicle type of the parked/stopped vehicle information among the parameter models of respective vehicle types learned by the second learning unit 412. Next, the predicting unit 406 calculates the parameters of the duration predicting model by giving the influential factors of the parked/stopped vehicle information to the acquired parameter model. The predicting model 406 determines the probability distribution expressed by the duration predicting model using the calculated parameter to be the predicted result. Then, the predicting unit 406 transmits the probability distribution of the predicting result to the arrival time calculation unit 407.

The arrival time calculation unit 407 calculates, based on the location of the parked/stopped vehicle 120 on the travelling road included in the parked/stopped vehicle information and the travelling information of the travelling vehicle 110 on the travelling road, an arrival time at which the travelling vehicle 110 arrives the location of the parked/stopped vehicle 120. Then, the arrival time calculation unit 407 transmits the calculated arrival time to the second determination unit 408. Note that the arrival time calculation unit 407 calculates the arrival time for respective travelling vehicles 110 in the case where a plurality of travelling vehicles 110 are detected by the first determination unit 403.

Figure 10:
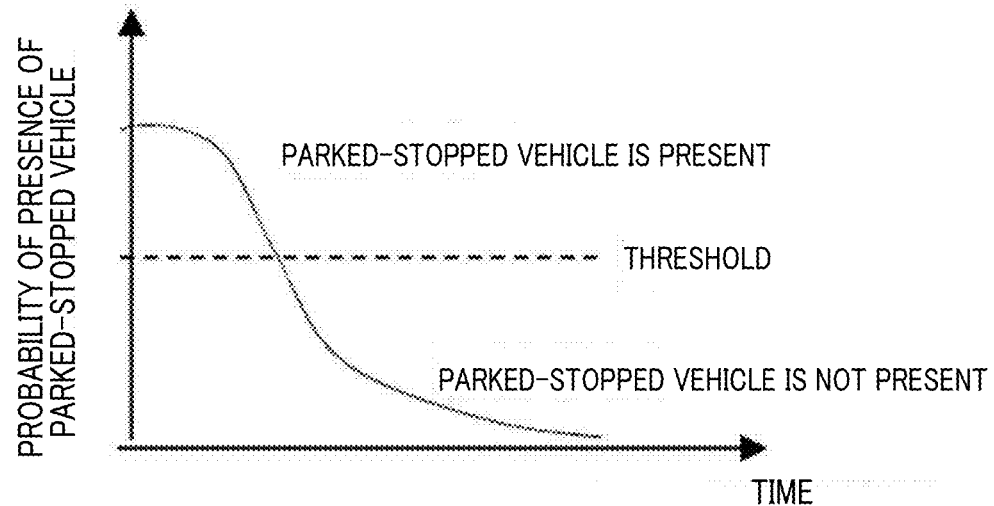
FIG. 10 is a conceptual diagram showing a process of comparison between a presence probability of a parked/stopped vehicle and a threshold.

The second determination unit 408 calculates, based on the calculated arrival time and the probability distribution predicted by the predicting unit 406, the presence probability of the parked/stopped vehicle 120 using the parked/stopped duration expressed by the difference between the detected time and the time at which the travelling vehicle 110 reaches the location of the parked/stopped vehicle 120. As shown in FIG. 10, the second determination unit 408 determines that the parked/stopped vehicle 120 is present at the arrival time calculated by the arrival time calculation unit 407 in the case where the presence probability of the calculated parked/stopped vehicle 120 is larger than or equal to a predetermined threshold, and determines that the parked/stopped vehicle 120 is not present at the arrival time calculated by the arrival time calculation unit 407 in the case where the presence probability of the calculated parked/stopped vehicle 120 is less than the predetermined threshold.

Here, the threshold value can be set to be arbitrary value in the initial state. For example, the initial value of the thresholds can be set to be higher such as 0.95 in order to avoid false alarm in the travelling support. In this case, the collected actual measurement data is further utilized as the learning data, whereby respective models are re-learned and the threshold value can be gradually lowered in response to improvement of the accuracy. In this method, in the initial state, since the determination of parked/stopped vehicle is with higher certainty, false alarm in which empty lanes are erroneously determined as being occupied by a parked/stopped vehicle could be avoided.

As a method for adjusting the threshold, a method expressed by the following equation (2) using a value in which F1 becomes the maximum can be utilized.

$$F1 = \frac{2 \text{Precision} * \text{Recall} * M/N}{\text{Precision} + \text{Recal} * M/N} \quad (2)$$

Here, M refers to a time penalty required to avoid parked/stopped vehicle, N refers to a penalty of time and operation required for changing the lane, where M>N. A plurality of thresholds are used for calculating the Precision and Recall in accordance with the equation (2), thereby maximizing the threshold value. According to the equation (2), no parked/stopped vehicle is present as a result of determination. However, in fact, a weighting is applied with Recall in order to avoid a case where a present parked/stopped vehicle is not detected.

The second determination unit 408 performs, when the first determination unit 403 detects a plurality of travelling vehicles 110, a determination for each travelling vehicle 110. Then, the second determination unit 408 transmits the determination results for the plurality of travelling vehicles 110 to the support information generation unit 409.

The support information generation unit 409 generates support information for performing the travelling support of the travelling vehicle 100. Specifically, the support information generation unit 409 generates a command indicating a lane change as the support information, when the second determination unit 408 determines that the parked/stopped vehicle 120 is present. Then, the support information generation unit 409 transmits the generated support information to the communication unit 401.

The comparing unit 413 compares the parked/stopped vehicle information received from the on-vehicle equipment 20 of the travelling vehicle 110 with the parked/stopped vehicle information received from the on-vehicle equipment 20 of the preceding vehicle 100.

Specifically, the comparing unit 413 compares the parked/stopped vehicle information received from the on-vehicle equipment 20 of the travelling vehicle 110 with the parked/stopped vehicle received from the on-vehicle equipment 20 of the preceding vehicle 100, and determines whether the parked/stopped vehicle corresponds to the previous observed vehicle type or not. If the parked/stopped vehicle does not correspond to the observed vehicle type, it means that the previously parked/stopped vehicle had left and another vehicle is parking/stopping and the prediction result is not correct. As the time when the previously parked/stopped vehicle left is unknown, we use the current time as the end time for the previously parked/stopped vehicle and the start time for the right-now parking/stopping vehicle. The end time for the previously parked/stopped vehicle is sent to the learning data storing unit 410 for re-learning, and the start time for the right-now parking/stopping vehicle is sent to the first determination unit 403 to determine how long the parking/stopping will last for further usage.

Next, effects and advantages of the travelling support system according to the first embodiment of the present disclosure will be described. FIG. 11 is a flowchart showing a parked/stopped vehicle detecting process of the on-vehicle equipment 20 according to the present embodiment of the present disclosure.

At step S101, the image acquiring unit 201 acquires an image captured by the camera 10.

At step S102, the parked/stopped vehicle detecting unit 202 detects the parked/stopped vehicle 120 from the image acquired at step S101.

At step S103, the parked/stopped vehicle detecting unit 202 determines whether the parked/stopped vehicle 120 is detected from the image acquired at step S101.

In the case where the parked/stopped vehicle 120 is not detected (step S103: NO), the process terminates the procedure.

On the other hand, in the case where the parked/stopped vehicle 120 is detected (step S103: YES), at step S104, the vehicle type detecting unit 203 detects the vehicle type of the parked/stopped vehicle 120 detected by the parked/stopped vehicle detecting unit 202.

At step S105, the parked/stopped vehicle information generating unit 204 generates the location of the detected parked/stopped vehicle 120, the detected time of the parked/stopped vehicle 120, the vehicle type indicating usage of the vehicle and the parked/stopped vehicle information including an occupancy ratio of the travelling road of the parked/stopped vehicle 120.

At step S106, the communication unit 205 transmits the parked/stopped vehicle information generated at step S105 to the automatic driving center 40, and terminates the procedure.

FIG. 12 is a flowchart showing a support information generation process of the automatic driving center 40 according to the embodiment of the present disclosure.

At step S201, the communication unit 401 receives the parked/stopped vehicle information from the on-vehicle equipment 20.

At step S202, the first determination unit 403 determines whether the parked/stopped duration which is a duration of parking or stopping of the parked/stopped vehicle 120 on the travelling road should be predicted. For example, the first determination unit 403 determines that the parked/stopped duration should be predicted, when the occupancy ratio of the travelling road included in the parked/stopped vehicle information which has been received at step S201 is larger than or equal to the first threshold.

In the case where the parked/stopped duration is not predicted (S202: NO), the process terminates the procedure.

On the other hand, in the case where the parked/stopped duration should be predicted (S202: YES), at step S203, the facility information generation unit 404 generates the facility information about a facility around the parked/stopped vehicle 120.

At step S204, the predicting unit 406 acquires, among parameter models corresponding to respective vehicle types learned by the second learning unit 412, a parameter model corresponding to the vehicle type of the parked/stopped vehicle information received at step S201.

At step S205, the predicting unit 406 applies the influential factors of the parked/stopped vehicle information received at step S201 to the parameter model acquired at step S204, whereby the parameters of the duration predicting model are calculated. Then, the probability distribution expressed by the duration predicting model using the calculated parameter is determined as the prediction result.

At step S206, the arrival time calculation unit 407 calculates, based on the location of the parked/stopped vehicle 120 on the travelling road included in the parked/stopped vehicle information and the travelling information of the travelling vehicle 110 on the travelling road, an arrival time at which the travelling vehicle 110 arrives the location of the parked/stopped vehicle 120.

At step S207, the second determination unit 408 calculates, based on the detected time and the probability distribution predicted at step S205, a presence probability of the parked/stopped vehicle 120, using the parked/stopped duration expressed a time difference between the detected time and the arrival time at which the travelling vehicle 110 arrives the location of the parked/stopped vehicle 120.

At step S208, the second determination unit 408 determines whether the calculated presence probability of the parked/stopped vehicle 120 is larger than or equal to a predetermined threshold.

When determined at step S208 that the calculated presence probability of the parked/stopped vehicle 120 is not larger than or equal to the predetermined threshold (S208: NO), the process terminates the procedure.

On the other hand, when determined at step S208 that the calculated presence probability of the parked/stopped vehicle 120 is larger than or equal to the predetermined threshold (S208: YES), at step S209, the support information generation unit 409 generates support information for performing the travelling support of the travelling vehicle 110, based on the determination result at step S208.

At step S210, the communication unit 401 transmits the travelling support information generated at step S209 to the on-vehicle equipment 20 of the travelling vehicle 110 via the network 70, and the process terminates the procedure. In the case where a plurality of travelling vehicles 110 are detected, processes of steps S206 to S210 are executed for each travelling vehicle 110.

FIG. 13 is a flowchart showing a lane change process of the on-vehicle equipment 20 according to an embodiment of the present disclosure.

At step S301, the communication unit 205 receives the travelling support information from the automatic driving center 40.

At step S302, the automatic driving control unit 206 changes the lane when the travelling support information received at step S301 includes the travelling support information, and terminates the procedure.

Figure 14:
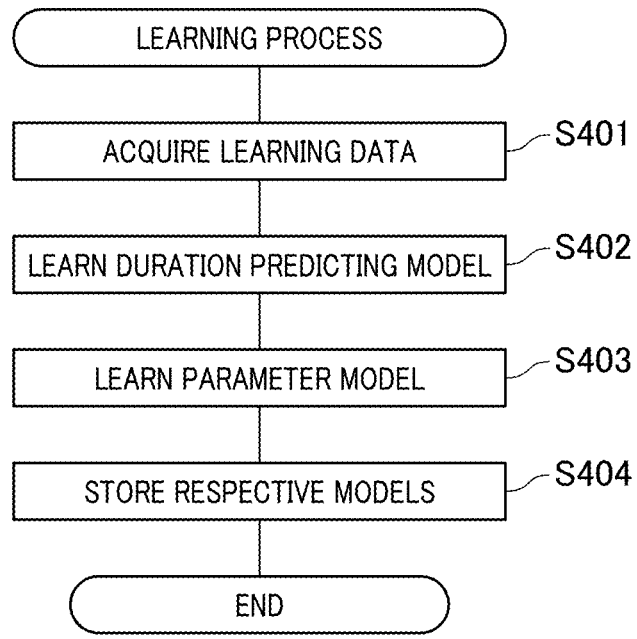
FIG. 14 is a flowchart showing a learning process routine of the automatic driving center.

FIG. 14 is a flowchart showing a learning process routine of the automatic driving center 40 according to the embodiment of the present disclosure.

At step S401, the first learning unit 411 acquires the learning data from the learning data storing unit 410.

At step S402, the first learning unit 411 learns, based on a plurality of parked/stopped duration of the same vehicle type and influential factors that influences the duration of the parked/stopped vehicles corresponding to the vehicle type which are collected in advance, a set of parameters of the duration predicting model for each pair of the vehicle type and the influential factors such that the duration predicting model is a probability distribution model showing the presence probability of the parked/stopped vehicle 120 for each parked/stopped duration.

At step S403, the second learning unit 412 learns, based on the duration predicting model learned by the first learning unit 411, a plurality of parked/stopped duration of the same vehicle type and the influential factors which are collected in advance, a parameter model for each vehicle type. The parameter model outputs, in response to an input of the influential factors and the vehicle type, the parameters of the duration prediction model corresponding to the vehicle type.

At step S404, the second learning unit 412 stores the parameter models learned for vehicle types into the model storing unit 405, and terminates the procedure.

As described above, according to the travelling support system in the embodiment of the present disclosure, the parked/stopped vehicle information indicating a detection of a parked/stopped vehicle on the travelling road can be received from the preceding vehicle or a sensor on the road, and the parked/stopped duration is predicted based on the parked/stopped vehicle information, and a duration predicting model that predicts a parked/stopped duration, whereby the parked/stopped duration of the parked/stopped vehicles on the travelling road can be predicted. Specifically, in the case where an unexpected obstacle such as parked/stopped vehicle is found late, the subject vehicle needs to temporally decelerate and stop to change the lane after finding the parked/stopped vehicle. Hence, unnecessary time is further required. In this case, the parked/stopped vehicle is detected in advance and the parked/stopped duration is predicted, whereby the travelling speed can be maintained and lane change operation can be performed before reaching the parked/stopped vehicle. As a result, smooth traveling can be accomplished.

Further, the first learning unit learns parameters of the duration predicting model based on a plurality of parked/stopped duration collected in advance, such that the duration predicting model is a probability distribution model showing a presence of probability of the parked/stopped vehicle for each parked/stopped duration. The second learning unit learns, based on the duration predicting model learned by the first learning model, a plurality of parked/stopped duration vehicle types of the parked/stopped vehicles corresponding to the parked/stopped duration and influential factors that influences the duration of the parked/stopped vehicles corresponding to the vehicle types, a parameter model that outputs in response to an input of the influential factors, parameters of the duration predicting model corresponding to the vehicle type. Then, as a prediction result, the predicting unit determines a probability distribution expressed by the duration predicting model, which is acquired based on the parameter model for the vehicle type learned by the second learning unit and the influential factors of the parked/stopped information, thereby accurately predicting the parked/stopped vehicle duration of the parked/stopped vehicles on the travelling road.

Further, the parked/stopped vehicle information further includes the location of the parked/stopped vehicle on the detected traveling road and the influential factors includes facility information about a facility located in the vicinity of the parked/stopped vehicle. The predicting unit acquires the facility information based on the location of the parked/stopped vehicle included in the parked/stopped vehicle information and determines, as a prediction result, a probability distribution expressed by the duration predicting model, which is built based on the parameter model learned by the second learning unit and the facility information. Hence, influential factors to the duration of the parked/stopped vehicle can be considered. Accordingly, the parked/stopped vehicle duration of the parked/stopped vehicles on the travelling road can be accurately predicted.

Also, the parked/stopped vehicle information further includes a location of the detected parked/stopped vehicle on the travelling road and the time at which the preceding vehicle detects the parked/stopped vehicle. Based on the location of the detected parked/stopped vehicle on the travelling road and the travelling information of the travelling vehicle on the travelling road, the arrival time calculation unit calculates the arrival time when the travelling vehicle arrives the location of the parked/stopped vehicle. Based on the detected time and the probability distribution predicted by the predicting unit, the determination unit determines whether the parked/stopped vehicle is present at the arrival time. The support information generation unit generates the support information for performing the travelling support of the travelling vehicle when determination unit determines that the parked/stopped vehicle is present at the arrival time. Thus, the automatic driving vehicle is able to perform a lane change in advance.

The present disclosure is not limited to the above-described embodiments and can be modified in various manners without departing the scope of the present disclosure.

For example, according to the above-described embodiment, as a travelling support system, respective processing units are configured as different apparatuses. However, for example, all of the processing units may be included in the same apparatus such as an on-vehicle equipment. Further, the on-vehicle equipment 20 of the preceding vehicle 100 and the on-vehicle equipment 20 of the traveling vehicle 110 are not necessarily of the same configuration. For example, the on-vehicle equipment 20 of the preceding vehicle 100 may be configured to perform a parked/stopped vehicle detecting process, and the on-vehicle equipment 20 of the travelling vehicle 110 may be configured to perform a lane change process. In other words, vehicles performing parked/stopped vehicle detecting process and vehicles receiving a travelling support may be mixed in the travelling support system 1.

Also, according to the above-described embodiment, it is assuming a level 4 automatic driving (limited area automatic driving). However, it is not limited thereto and the embodiments can be applied to other level of automatic driving. For example, in the case where the travelling vehicle 110 is travelling under a driver's operation, the support information generation unit 409 generates a lane change indication as support information instead of a lane change request. In this case, the automatic driving control unit 206 indicates a lane change to the driver. For example, the automatic driving control unit 206 controls the display unit 16 to output sound to notify the driver of the lane change. In the case where the vehicle is not an automatic driving vehicle, the embodiment may be applied to a general vehicle such as POV (personally owned vehicle). In this case, only the image acquiring unit 201 and the communication unit 205 are included in the on-vehicle equipment 20, and other functions may be included in the automatic driving center 40.

Figure 15:
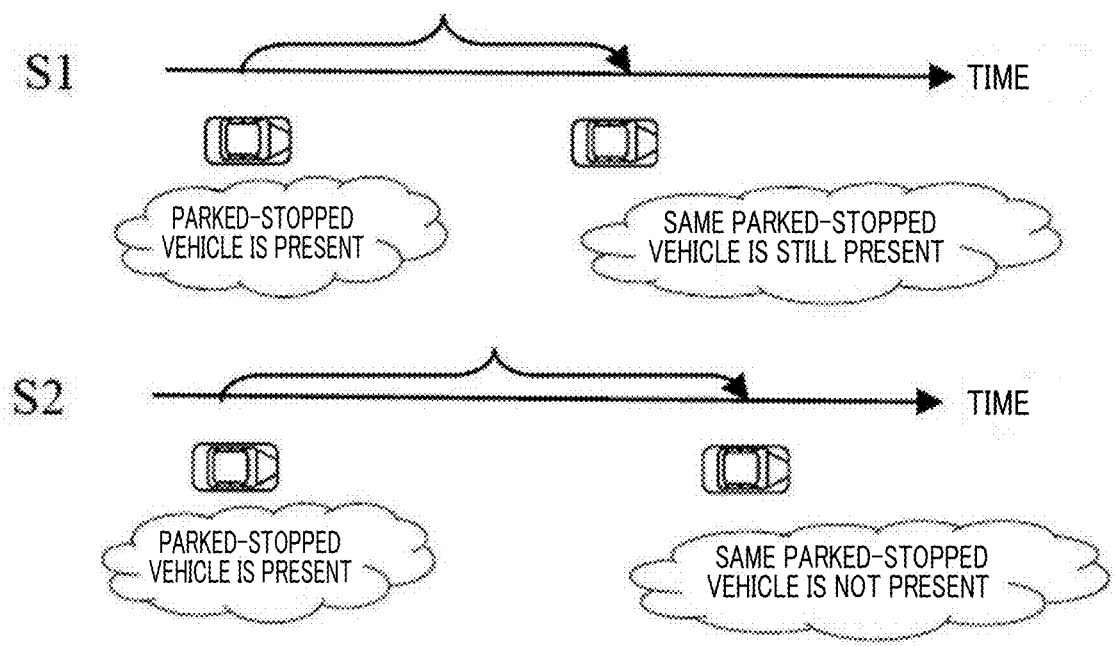
FIG. 15 is a conceptual diagram showing an example of samples of the learning data.
Figure 16:
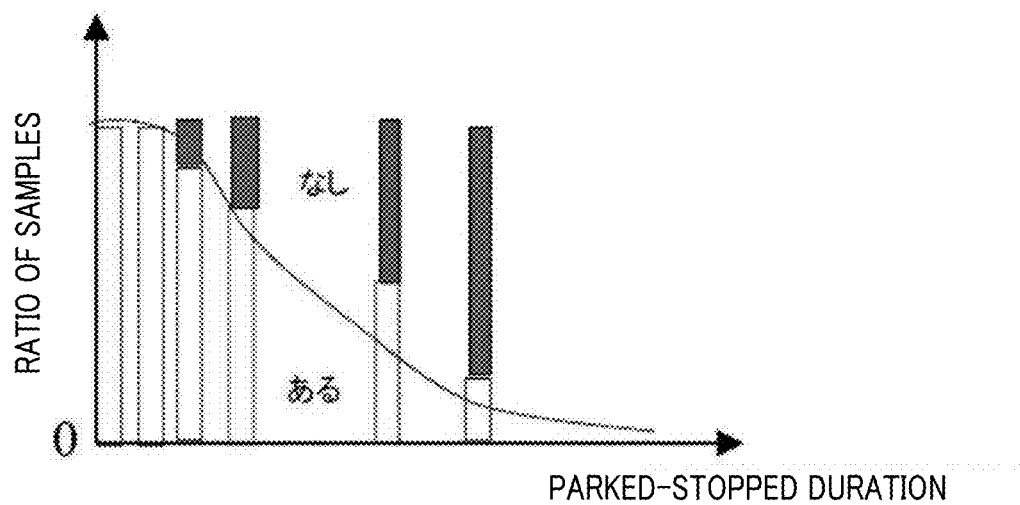
FIG. 16 is a graph showing a ratio of samples for each parked/stopped duration.

Further, according to the above-described embodiment, as the parked/stopped duration, a case is described in which a pair of the start time and the end time of the parking or stopping of the parked/stopped vehicle 120 is utilized. However, this is not limited thereto. In the case where a data log has not been collected from the parked/stopped vehicle so that accurate start time and the end time of the parked/stopped vehicle may not be collected, a time at which the on-vehicle equipment 20 or the automatic driving center 40 detects the parked/stopped vehicle 120 and a time at which the on-vehicle equipment 20 or the automatic driving center 40 lastly detects the parked/stopped vehicle 120 or a time at which the parked/stopped vehicle 120 is no longer detected can be utilized for the parked/stopped duration. The sample S1 of the parked/stopped duration shown in FIG. 15 is expressed in accordance with a time at which the on-vehicle equipment 20 detects a parking or stopping of the parked/stopped vehicle 120 and a time at which the on-vehicle equipment 20 lastly detects the parked/stopped vehicle. The sample S2 of the parked/stopped duration shown in FIG. 15 is expressed in accordance with a time at which the on-vehicle equipment 20 detects a parking or stopping of the parked/stopped vehicle 120 and a time at which the on-vehicle equipment 20 no longer detects the parked/stopped vehicle 120. The learning data collected in such a manner is expressed as a graph showing a relationship between the ratio of samples and the parked/stopped vehicle duration such as to express whether the parked/stopped vehicle 120 in the samples is present for each parked/stopped duration. The graph shown in FIG. 16 illustrates a graph in which a ratio is shown as a histogram. Note that since a case shown in FIG. 8 and a case shown in FIG. 16 do not necessarily indicate similar probability distribution, individual models are required for these cases.

Figure 17:
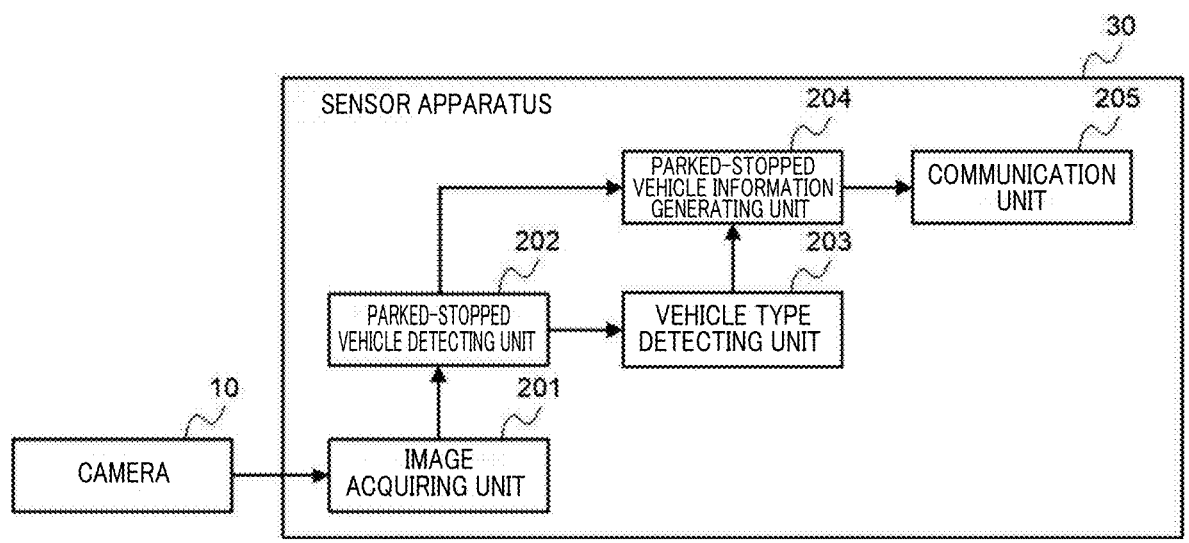
FIG. 17 is a block diagram showing a functional configuration of a sensor apparatus.

As shown in FIG. 1, the sensor apparatus 30 can be included in the travelling support system 1. As shown in FIG. 2, the sensor apparatus 30 serves, for example, an infrastructure sensor capable of capturing the parked/stopped vehicle 120. Also, the above-described learning data may be collected by the sensor apparatus 30. The sensor apparatus 30 is composed of CPU, RAM, ROM in which programs for executing processes (described later) and a camera 10. As shown in FIG. 17, the sensor apparatus 30 is composed of functional blocks including an image acquiring unit 201, a parked/stopped vehicle detecting unit 202, a vehicle type detecting unit 203, a parked/stopped vehicle information generating unit 204 and a communication unit 205. For configurations similar to the on-vehicle equipment 20, the same reference numbers are applied and detailed explanation will be omitted. According to such a configuration, parked/stopped vehicle information indicating a detection of a parked/stopped vehicle on the travelling road is received from a sensor on the travelling road, the parked/stopped duration is predicted based on the parked/stopped vehicle information, a duration predicting model that predicts a parked/stopped duration as a duration in which the parked/stopped vehicle continues to park or stop, whereby the parked/stopped duration of the parked/stopped vehicles on the travelling road can be predicted. Note that the parked/stopped vehicle detecting unit 202, the vehicle type detecting unit 203, the parked/stopped vehicle information generating unit 204 may be included in the automatic driving center 40.

Further, the travelling support system 1 may be configured to predict the parked/stopped duration, thereby notifying the traveling vehicle 110 of whether the vehicle is able to park or stop on the travelling road or not, to recommend a lane change in advance. In this case, the support information generation unit 409 generates the support information in which a previously parked/stopped location is determined as a parking/stopping location candidate, in the case where the second determination unit 407 determines that no parked/stopped vehicle 120 is present at the arrival time of the travelling vehicle 110. Then, the automatic driving control unit 206 performs a lane change or an indication of a lane change based on the travelling support information.

Also, other configuration can be utilized in which in response to an input of a location where the driver plans to park or stop the vehicle, the on-vehicle equipment 20 of the preceding vehicle 100 or sensor apparatus 30 generates parking/stopping support information of the location where the driver plans to park or stop the vehicle. Thus, the travelling vehicle 110 is able to be parked or stopped safely. In this case, the travelling support system 1 can be used not only for a case illustrated in FIG. 2, but also for a case in a parking space.

Further, a configuration may be utilized in which past parked/stopped locations of a plurality of travelling vehicles 110 having the same vehicle type are recorded in advance, and it is determined whether a parked/stopped vehicle is present at the past parked/stopped locations at a time when the travelling vehicle 110 arrives. In this case, if no parked/stopped vehicle is present at the past parked/stopped locations, these locations can be used as a stop location candidate for an MRM (minimum risk manoeuver). In this case, the threshold of the second determination unit 408 can be set such that the initial value of the threshold is set low such as 0.35. In this case, the collected actual measurement data is determined as additional learning data, whereby the respective models are re-learned and the threshold value can be gradually adjusted higher because of improved accuracy. According to this configuration, in the initial state, since it is likely to be determined that a parked/stopped vehicle is not present, erroneous detection that a parked/stopped vehicle is determined as present despite the parked/stopped vehicle not actually being present can be avoided. As a method for adjusting the threshold, similar to the above-described equation, a method using a value in which F1 becomes the maximum can be utilized. Further, a configuration in which a plurality of available parked/stopped locations are indicated, can be utilized for a desired area for parking or stopping.

Note that functions accomplished by software in the above-described embodiment, that is, a program executed by the CPU may be accomplished by hardware. In this case, PLD (programmable logic device) capable of changing its circuit configuration, such as FPGA (field programmable gate array), and a dedicated electrical circuit having a circuit configuration designed for executing specific process such as an ASIC (application specific integrated circuit) can be exemplified. Moreover, the above-described functions can be accomplished by one processor (i.e. CPU) or combination of the same type or different types of two or more processors (e.g. a plurality of FPGAs, or a combination of CPU and FPGA). Specifically, hardware structures of these various processors are configured as electrical circuit in which circuit elements such as semiconductor elements are combined.

According to the above-described embodiment, the program is installed in the ROM 12 or the storage 14 in advance. However, it is not limited thereto. The program may be provided as being stored in a non-transitory recording media, such as CD-ROM (company disk read only memory), DVDROM (digital versatile disk read only memory) and USB (universal serial bus) device. Further, the above-described respective programs may be downloaded from external equipment via a network.

For the above-described embodiments, the following appendix will be disclosed.

Appendix 1

A travelling support apparatus comprising:
a memory unit; and
at least one processor connected to the memory unit, wherein
the processor is configured to receive parked/stopped vehicle information indicating a detection of a parked/stopped vehicle on a travelling road from a preceding vehicle which is travelling or a sensor on the travelling road and predict, based on the parked/stopped vehicle information and a duration predicting model that predicts a parked/stopped duration as a duration in which the parked/stopped vehicle continues to park or stop, as the parked/stopped duration.

Appendix 2

A non-transitory tangible recording media storing a program causing a computer to execute processes comprising:
a process of receiving parked/stopped vehicle information indicating a detection of a parked/stopped vehicle on a travelling road from a preceding vehicle which is travelling or a sensor on the travelling road; and
a process of predicting, based on the parked/stopped vehicle information and a duration predicting model that predicts a parked/stopped duration as a duration in which the parked/stopped vehicle continues to park or stop, the parked/stopped duration.

(Conclusion)

As described, the travelling support system according to the present disclosure includes a receiving unit and a predicting unit. The receiving unit is configured to receive parked/stopped vehicle information indicating a detection of a parked/stopped vehicle on a travelling road from a preceding vehicle which is travelling or from a sensor on the travelling road. The predicting unit is configured to predict, based on the parked/stopped vehicle information and a duration predicting model that predicts a parked/stopped duration as a duration in which the parked/stopped vehicle continues to park or stop, the parked/stopped duration.

A method for travelling support according to the present disclosure includes receiving parked/stopped vehicle information indicating a detection of a parked/stopped vehicle on a travelling road from a preceding vehicle which is travelling or from a sensor on the travelling road; and predicting, based on the parked/stopped vehicle information and a duration predicting model that predicts a parked/stopped duration as a duration in which the parked/stopped vehicle continues to park or stop, the parked/stopped duration.

A program according to the present disclosure causes a computer to execute processes includes: a process of receiving parked/stopped vehicle information indicating a detection of a parked/stopped vehicle on a travelling road from a preceding vehicle which is travelling or a sensor on the travelling road; and a process of predicting, based on the parked/stopped vehicle information and a duration predicting model that predicts a parked/stopped duration as a duration in which the parked/stopped vehicle continues to park or stop, the parked/stopped duration.

According to the travelling support system, a travelling support method and a program, the receiving unit receives parked/stopped vehicle information indicating a detection of a parked/stopped vehicle on a travelling road from a preceding vehicle which is travelling or a sensor on the travelling road, and the predicting unit predicts, based on the parked/stopped vehicle information and a duration predicting model that predicts a parked/stopped duration as a duration in which the parked/stopped vehicle continues to park or stop, the parked/stopped duration.

Thus, the parked/stopped vehicle information indicating a detection of the parked/stopped vehicle on the travelling road is received from a preceding vehicle which is travelling or a sensor on the traveling road, and the parked/stopped duration is predicted based on the parked/stopped vehicle information and a duration predicting model that predicts a parked/stopped duration as a duration in which the parked/stopped vehicle continues to park or stop. Hence, the parked/stopped vehicle duration of the parked/stopped vehicle on the travelling road can be predicted.

Further, the travelling support system according to the present disclosure further includes a first learning unit. The first learning unit is configured to learn parameters of the duration predicting model, based on a plurality of the parked/stopped duration collected in advance, such that the duration predicting model is a probability distribution model showing a presence probability of the parked/stopped vehicle for each parked/stopped duration; and the predicting unit is configured to predict the parked/stopped duration of the parked/stopped vehicle based on the duration predicting model learned by the first learning unit.

Furthermore, the travelling support system according to the present disclosure further includes a second learning unit.

The parked/stopped vehicle information further includes type of vehicle representing usage of a vehicle; the first learning unit is configured to learn the parameters of the duration predicting model for each pair of the vehicle type and the influential factors, based on a plurality of parked/stopped duration, vehicle types of the parked/stopped vehicles corresponding to the parked/stopped duration and influential factors that influences the duration of the parked/stopped vehicles corresponding to the vehicle types which are collected in advance;

the second learning unit is configured to learn, based on the duration predicting model learned by the first learning unit, a plurality of parked/stopped duration, vehicle type of the parked/stopped vehicles corresponding to the parked/stopped duration and influential factors that influences the duration of the parked/stopped vehicles corresponding to the vehicle types which are collected in advance, a parameter model for each vehicle type, the parameter model outputting, in response to an input of the influential factors, the parameter of the duration prediction model corresponding to the vehicle type; and the predicting unit is configured to determine a probability distribution expressed by the duration predicting model which is acquired based on the parameter model for the vehicle type learned by the second learning unit and the influential factors of the parked/stopped information, to be a prediction result.

The parked/stopped vehicle information of the travelling support system according to the present disclosure further includes a location of the detected parked/stopped vehicle on the travelling road; the influential factors includes facility information about a facility located in the vicinity of the detected parked/stopped vehicle; and the predicting unit is configured to acquire the facility information based on the location of the parked/stopped vehicle included in the parked/stopped vehicle information and determines, as a prediction result, a probability distribution expressed by the duration predicting model, which is acquired based on the parameter model learned by the second learning unit and the facility information.

The travelling support system according to the present disclosure further includes an arrival time calculation unit, a determination unit, a support information generation unit.

The parked/stopped vehicle information further includes a location of the detected parked/stopped vehicle on the travelling road and a time at which the preceding vehicle or the sensor detects the parked/stopped vehicle; the arrival time calculation unit is configured to calculate, based on the location of the detected parked/stopped vehicle on the travelling road and travelling information of the travelling vehicle on the travelling road, an arrival time at which the travelling vehicle arrives the location of the parked/stopped vehicle; the determination unit is configured to determine, based on the detected time and the probability distribution predicted by the predicting unit, whether the parked/stopped vehicle is present at the arrival time; and the support information generation unit is configured to generate support information for performing travelling support of the travelling vehicle when the determination unit determines that the parked/stopped vehicle is present at the arrival time.

The determination unit of the travelling support system according to the present disclosure is configured to calculate, based on the detected time and the probability distribution predicted by the predicting unit, a presence probability of the parked/stopped vehicle using the parked/stopped duration expressed by a difference between the detected tine and the time at which the travelling vehicle reaches the location of the parked/stopped vehicle, and determine that the parked/stopped vehicle is present at the arrival time when the calculated presence probability of the parked/stopped vehicle is larger than or equal to a predetermined threshold.

The support information generation unit of the travelling support system according to the present disclosure is configured to generate, when the determination unit determines that the parked/stopped vehicle is present, a lane change request or a lane change indication as the support information.

The support information generation unit of the travelling support system according to the present disclosure is configured to generate, when the determination unit determines that no parked/stopped vehicle is present, the support information in which the past parked/stopped location is determined as a parking/stopping location candidate.

The travelling support system according to the present disclosure further includes a transmitting unit. The transmitting unit is configured to transmit the support information generated by the support information generation unit to the travelling vehicle.

According to the travelling support system, the travelling support method and the program thereof, the parked/stopped duration of the parked/stopped vehicle on the travelling road can be predicted.

What is claimed is:

1. A travelling support system comprising:
   a receiving unit configured to receive parked/stopped vehicle information indicating a detection of a parked/stopped vehicle on a travelling road from a preceding vehicle that is travelling or a sensor on the travelling road;
   a predicting unit that predicts, based on the parked/stopped vehicle information and a duration predicting model that predicts a parked/stopped duration as a duration in which the parked/stopped vehicle continues to park or stop, the parked/stopped duration;
   a first learning unit configured to learn parameters of the duration predicting model, based on a plurality of parked/stopped duration, which is collected in advance, such that the duration predicting model is a probability distribution model showing a presence probability of the parked/stopped vehicle for each parked/stopped duration,
   the first learning unit also configured to learn, based on the plurality of parked/stopped duration, a vehicle type of the parked/stopped vehicles corresponding to the parked/stopped duration, and influential factors that influence the duration of the parked/stopped vehicles corresponding to the vehicle types, which are collected in advance, the parameters of the duration predicting model for each pair of the vehicle type and the influential factors; and
   a second learning unit configured to learn a parameter model for each vehicle type, based on the duration predicting model learned by the first learning unit, the plurality of parked/stopped duration, the vehicle type of the parked/stopped vehicles corresponding to the parked/stopped duration, and the influential factors that influence the duration of the parked/stopped vehicles corresponding to the vehicle types, which are collected in advance, the parameter model outputting, in response to an input of the influential factors, the parameters of the duration prediction model corresponding to the vehicle type, wherein
   the predicting unit is further configured to predict the parked/stopped duration of the parked/stopped vehicle based on the duration predicting model learned by the first learning unit,
   the parked/stopped vehicle information further includes a type of vehicle representing usage of a vehicle, and
   the predicting unit is further configured to determine a probability distribution expressed by the duration predicting model, which is acquired based on the parameter model for each vehicle type learned by the second learning unit and the influential factors of the parked/stopped vehicle information, to be a prediction result.

2. The travelling support system according to claim 1, the parked/stopped vehicle information further includes a location of the detected parked/stopped vehicle on the travelling road;
   the influential factors includes facility information about a facility located in a vicinity of the detected parked/stopped vehicle; and
   the predicting unit is configured to acquire the facility information based on the location of the parked/stopped vehicle included in the parked/stopped vehicle information and determines, as a prediction result, a probability distribution expressed by the duration predicting model, which is acquired based on the parameter model learned by the second learning unit and the facility information.

3. The travelling support system according to claim 1 further comprising an arrival time calculation unit, a determination unit, a support information generation unit, wherein
   the parked/stopped vehicle information further includes a location of the detected parked/stopped vehicle on the travelling road and a time at which the preceding vehicle or the sensor detects the parked/stopped vehicle;
   the arrival time calculation unit is configured to calculate, based on the location of the detected parked/stopped vehicle on the travelling road and travelling information of a travelling vehicle on the travelling road, an arrival time at which the travelling vehicle arrives the location of the parked/stopped vehicle;
   the determination unit is configured to determine, based on the detected time and the probability distribution predicted by the predicting unit, whether the parked/stopped vehicle is present at the arrival time; and
   the support information generation unit is configured to generate support information for performing travelling support of the travelling vehicle when the determination unit determines that the parked/stopped vehicle is present at the arrival time.

4. The travelling support system according to claim 3, wherein
   the determination unit is configured to calculate, based on the detected time and the probability distribution predicted by the predicting unit, a presence probability of the parked/stopped vehicle using the parked/stopped duration expressed by a difference between the detected time and the time at which the travelling vehicle reaches the location of the parked/stopped vehicle, and determine that the parked/stopped vehicle is present at the arrival time when the calculated presence probability of the parked/stopped vehicle is larger than or equal to a predetermined threshold.

5. The travelling support system according to claim 3, wherein
   the support information generation unit is configured to generate, when the determination unit determines that the parked/stopped vehicle is present, a lane change request or a lane change indication as the support information.

6. The travelling support system according to claim 3, wherein
   the support information generation unit is configured to generate, when the determination unit determines that a previously parked/stopped location where no parked/stopped vehicle will be present at the arrival time of the travelling vehicle, the support information in which a previously parked/stopped location is determined as a parking/stopping location candidate.

7. The travelling support system according to claim 5 further comprising a transmitting unit, wherein
the transmitting unit is configured to transmit the support information generated by the support information generation unit to the travelling vehicle.

8. A method for travelling support comprising:
receiving parked/stopped vehicle information indicating a detection of a parked/stopped vehicle on a travelling road from a preceding vehicle that is travelling or from a sensor on the travelling road;
predicting, based on the parked/stopped vehicle information and a duration predicting model that predicts a parked/stopped duration as a duration in which the parked/stopped vehicle continues to park or stop, the parked/stopped duration;
learning parameters of the duration predicting model, based on a plurality of parked/stopped duration, which is collected in advance, such that the duration predicting model is a probability distribution model showing a presence probability of the parked/stopped vehicle for each parked/stopped duration;
learning, based on the plurality of parked/stopped duration, a vehicle type of the parked/stopped vehicles corresponding to the parked/stopped duration, and influential factors that influence the duration of the parked/stopped vehicles corresponding to the vehicle types, which are collected in advance, the parameters of the duration predicting model for each pair of the vehicle type and the influential factors;
learning a parameter model for each vehicle type, based on the duration predicting model learned by the first learning unit, the plurality of parked/stopped duration, the vehicle type of the parked/stopped vehicles corresponding to the parked/stopped duration, and the influential factors that influence the duration of the parked/stopped vehicles corresponding to the vehicle types, which are collected in advance, the parameter model outputting, in response to an input of the influential factors, the parameters of the duration prediction model corresponding to the vehicle type; and
determining a probability distribution expressed by the duration predicting model, which is acquired based on the parameter model for each vehicle type and the influential factors of the parked/stopped vehicle information, to be a prediction result, wherein
the parked/stopped duration of the parked/stopped vehicle is predicted based on the duration predicting model, and the parked/stopped vehicle information further includes a type of vehicle representing usage of a vehicle.

9. A travelling support system comprising:
a processor;
a non-transitory computer-readable storage medium; and
a set of computer-executable instructions stored on the non-transitory computer-readable storage medium that cause the processor to perform:
a process of receiving parked/stopped vehicle information indicating a detection of a parked/stopped vehicle on a travelling road from a preceding vehicle that is travelling or a sensor on the travelling road;
a process of predicting, based on the parked/stopped vehicle information and a duration predicting model that predicts a parked/stopped duration as a duration in which the parked/stopped vehicle continues to park or stop, the parked/stopped duration;
a process of learning parameters of the duration predicting model, based on a plurality of parked/stopped duration, which is collected in advance, such that the duration predicting model is a probability distribution model showing a presence probability of the parked/stopped vehicle for each parked/stopped duration;
a process of learning, based on the plurality of parked/stopped duration, a vehicle type of the parked/stopped vehicles corresponding to the parked/stopped duration, and influential factors that influence the duration of the parked/stopped vehicles corresponding to the vehicle types, which are collected in advance, the parameters of the duration predicting model for each pair of the vehicle type and the influential factors;
a process of learning a parameter model for each vehicle type, based on the duration predicting model learned by the first learning unit, the plurality of parked/stopped duration, the vehicle type of the parked/stopped vehicles corresponding to the parked/stopped duration, and the influential factors that influence the duration of the parked/stopped vehicles corresponding to the vehicle types, which are collected in advance, the parameter model outputting, in response to an input of the influential factors, the parameters of the duration prediction model corresponding to the vehicle type; and
a process of determining a probability distribution expressed by the duration predicting model, which is acquired based on the parameter model for each vehicle type and the influential factors of the parked/stopped vehicle information, to be a prediction result, wherein
the parked/stopped duration of the parked/stopped vehicle is predicted based on the duration predicting model, and
the parked/stopped vehicle information further includes a type of vehicle representing usage of a vehicle.

* * * * *